United States Patent
Kim et al.

(10) Patent No.: US 9,648,280 B2
(45) Date of Patent: May 9, 2017

(54) TV APPARATUS

(71) Applicant: LG INNOTEK CO., LTD., Seoul (KR)

(72) Inventors: Min Soo Kim, Seoul (KR); Jong Hyun Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 554 days.

(21) Appl. No.: 14/040,184

(22) Filed: Sep. 27, 2013

(65) Prior Publication Data

US 2014/0092199 A1 Apr. 3, 2014

(30) Foreign Application Priority Data

Sep. 28, 2012 (KR) .................. 10-2012-0109239

(51) Int. Cl.
| | | |
|---|---|---|
| *H04N 7/15* | (2006.01) | |
| *H04N 5/64* | (2006.01) | |
| *H04N 7/14* | (2006.01) | |
| *H04N 21/4223* | (2011.01) | |
| *H04N 21/442* | (2011.01) | |
| *H04N 21/4788* | (2011.01) | |
| *H04N 21/81* | (2011.01) | |
| *H04N 13/02* | (2006.01) | |
| *H04N 5/225* | (2006.01) | |
| *H04N 5/232* | (2006.01) | |

(52) U.S. Cl.
CPC .............. *H04N 7/15* (2013.01); *H04N 5/2251* (2013.01); *H04N 5/23241* (2013.01); *H04N 5/64* (2013.01); *H04N 7/142* (2013.01); *H04N 13/0271* (2013.01); *H04N 21/4223* (2013.01); *H04N 21/4424* (2013.01); *H04N 21/4788* (2013.01); *H04N 21/816* (2013.01); *H04N 13/0242* (2013.01); *H04N 13/0253* (2013.01)

(58) Field of Classification Search
CPC combination set(s) only.
See application file for complete search history.

(56) References Cited

U.S. PATENT DOCUMENTS

| | | | |
|---|---|---|---|
| 7,013,288 B1 * | 3/2006 | Reifel ................. | G06Q 10/00 705/14.1 |
| 2004/0095500 A1 | 5/2004 | Sato et al. | |
| 2006/0139463 A1 * | 6/2006 | Heinonen ............ | H04N 5/2251 348/239 |
| 2007/0009247 A1 | 1/2007 | Maeda et al. | |
| 2011/0115886 A1 | 5/2011 | Nguyen et al. | |
| 2012/0120183 A1 | 5/2012 | Gagneraud | |
| 2012/0169838 A1 | 7/2012 | Sekine | |
| 2012/0242777 A1 | 9/2012 | Yu et al. | |
| 2013/0222530 A1 * | 8/2013 | Shanmukhadas ...... | H04N 19/40 348/14.13 |
| 2014/0042319 A1 * | 2/2014 | Pickett .................. | H04N 5/33 250/330 |

FOREIGN PATENT DOCUMENTS

| | | |
|---|---|---|
| EP | 2 009 879 A1 | 12/2008 |
| JP | 2006-270987 A | 10/2006 |
| WO | WO 2005/043890 A1 | 5/2005 |

* cited by examiner

*Primary Examiner* — Joseph J Nguyen
(74) *Attorney, Agent, or Firm* — Birch, Stewart, Kolasch & Birch, LLP

(57) ABSTRACT

A TV apparatus according to an exemplary embodiment of the present disclosure includes a TV body configured to display an image, and
a camera module configured to be driven, in a case the TV body is protruded.

11 Claims, 7 Drawing Sheets

TV APPARATUS

CROSS-REFERENCE TO RELATED APPLICATION

The present application is based on, and claim priority from, Korean Application Numbers 10-2012-0109239, filed on Sep. 28, 2012, the disclosures of which is incorporated by reference herein in its entirety.

BACKGROUND OF THE INVENTION

Field of the Invention

Exemplary aspects of the present disclosure relate to a TV apparatus.

Description of Related Art

In general, a TV (Television) apparatus is an apparatus configured to view a broadcasting program by receiving a broadcasting image.

A multilateral research is being waged recently to enable a TV apparatus to have other functions than the basic function of viewing a broadcasting image.

For example, the TV apparatus is being developed and evolved to enable multiple functions such as a function of displaying photographs and images by searching the photographs and images, a function of monitoring by being connected to Internet and a function of performing a video telephone, to name a few.

Particularly, a TV apparatus is being developed to enable a video conferencing service system configured to perform a conference by allowing participants in remote areas to mutually discuss matters on a real-time base through images as a conference service.

However, the function by the TV apparatus to provide a video conferencing service system is still in its infancy, and therefore, a multilateral technology must be developed for further improvement of the video conferencing service system.

SUMMARY OF THE INVENTION

Exemplary aspects of the present disclosure are to substantially solve at least the above problems and/or disadvantages and to provide at least the advantages as mentioned below. Thus, the present disclosure is directed to provide a TV apparatus configured to minimize a power consumption of a camera module mounted on a TV apparatus.

In one general aspect of the present disclosure, there is provided a TV apparatus, the apparatus comprising:
a TV body configured to display an image; and
a camera module configured to be driven, in a case the TV body is protruded.

Preferably, but not necessarily, the TV apparatus may further comprise a driving unit configured to protrude the camera module from the TV body.

Preferably, but not necessarily, the camera module may be configured to realize a VCS (Video Conference System).

Preferably, but not necessarily, the driving of the camera module may include any one of a driving of the camera module while the camera module is in a power-on state, a driving of the camera module while the camera module is off a sleep mode, and a driving of the camera module while the camera module is off a standby mode.

Preferably, but not necessarily, the TV body may include a receiving unit configured to receive the driving unit, and an actuator configured to allow the driving unit to be in a non-protruded state from the TV body by accommodating the driving unit into the receiving unit, or to allow the driving unit to be in a protruded state from the TV body by distancing the driving unit from the receiving unit.

Preferably, but not necessarily, the driving unit may be mounted with a photo reflector, and the receiving unit is formed with a reflector configured to reflect light emitted from the photo reflector to the photo reflector.

Preferably, but not necessarily, the driving unit may be deviated from the receiving unit, in a case the driving unit is protruded from the TV body, to drive the camera module by preventing the light emitted from the photo reflector from being reflected to the photo reflector.

Preferably, but not necessarily, the driving unit may be accommodated into the receiving unit, in a case the driving unit is in a non-protruded state from the TV body, to prevent the camera module from being driven by allowing the light emitted from the photo reflector to be reflected from the reflector formed on the receiving unit and to be incident on the photo reflector.

Preferably, but not necessarily, the camera module may include a left eye camera unit configured to photograph a left eye image, and a right eye camera unit configured to be distanced from the left eye camera unit to photograph a right eye image.

Preferably, but not necessarily, the camera module may include a first camera unit, a second camera unit distanced from the first camera unit to photograph a 3D (three dimensional) image, and a third camera unit distanced from the second camera unit to extract a 3D depth.

Preferably, but not necessarily, the camera module may further include a microphone interposed between the first and second camera units or a microphone interposed between the second and third camera units.

Preferably, but not necessarily, the TV body may include a 3D image generator configured to generate a 3D image using an image photographed by the first and second camera units, and a 3D depth extractor configured to extract a 3D depth using an image photographed by the first and third camera units.

In another general aspect of the present disclosure, there is provided a TV apparatus, the TV apparatus comprising:
a TV body configured to display an image; and
a camera module mounted on the TV body and configured to be turned on and turned off by a magnetic field configured to change in response to movement of the camera module.

Preferably, but not necessarily, the movement of the camera module may be sliding or tilting.

Preferably, but not necessarily, the TV apparatus may further comprise a magnetic sensor configured to detect a magnetic field that changes in response to the movement of the camera module.

Preferably, but not necessarily, the TV apparatus may further comprise a magnet fixed to the TV body, and a magnetic sensor configured to change positions in response to the movement of the camera module, and configured to detect or not to detect a magnetic field of the magnet.

Preferably, but not necessarily, the TV apparatus may further comprise: a magnet configured to change positions in response to the movement of the camera module; and a magnetic sensor configured to detect or not to detect a magnetic field of the magnet in response to the position change of the magnet.

In still another general aspect of the present disclosure, there is provided a TV apparatus, the TV apparatus comprising:
a TV body configured to display an image;

a camera module configured to protrude or not to protrude from the TV body; and a photo diode mounted on the camera module and configured to output a signal for controlling operation of the camera module by receiving or not receiving light, in a case the camera module protrudes or fails to protrude from the TV body.

Preferably, but not necessarily, the photo diode may output a control signal configured to turn on an electric power of the camera module by receiving the light, in a case the camera module protrudes from the TV body, and configured to turn off an electric power of the camera module by not receiving the light, in a case the camera module fails to protrude from the TV body.

Preferably, but not necessarily, the TV apparatus may further comprise a controller configured to control the operation of the camera module by receiving the control signal of the photo diode.

In an advantageous aspect, embedment of a camera module inside the TV apparatus can be realized, and power consumption of a camera module can be minimized by being driven, in a case the camera module protrudes from a TV body to photograph an object.

DETAILED DESCRIPTION OF PREFERRED EMBODIMENTS

Figure 1:
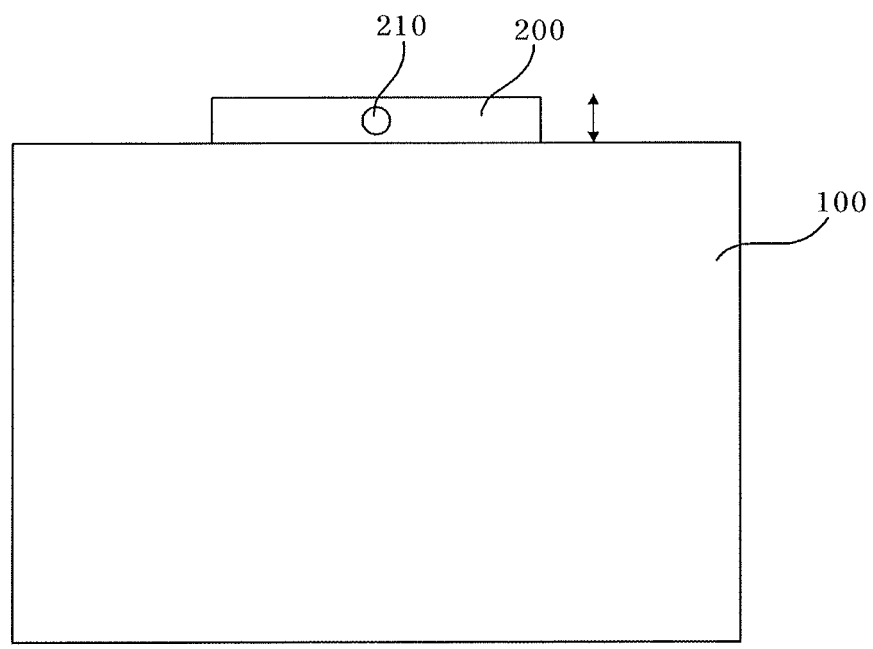
FIG. 1 is a mimetic front view illustrating a TV apparatus according to an exemplary embodiment of the present disclosure.

Now, exemplary embodiments of the present disclosure will be described in detail with reference to the accompanying drawings.

In describing the present disclosure, certain layers, sizes, shapes, components or features may be exaggerated for clarity and convenience. Accordingly, the meaning of specific terms or words used in the specification and claims should not be limited to the literal or commonly employed sense, but should be construed or may be different in accordance with the intention of a user or an operator and customary usages.

Therefore, the definition of the specific terms or words should be based on the contents across the specification. It should be emphasized, however, that the present disclosure is not limited to a particular disclosure, as explained above. It should be understood that other technical subjects not mentioned herein may be appreciated by those skilled in the art.

In the drawings, the size and relative sizes of layers, regions and/or other elements may be exaggerated or reduced for clarity.

FIG. 1 is a mimetic front view illustrating a TV apparatus according to an exemplary embodiment of the present disclosure.

The TV apparatus according to an exemplary embodiment of the present disclosure includes a TV body (100) configured to display an image, and a camera module (210) configured to be driven by being mounted at one side of the TV body (100). Although the camera module (210) is protruded from an upper surface of the TV body (100), the present disclosure is not limited thereto.

At this time the TV apparatus according to the exemplary embodiment of the present disclosure may further comprise a driving unit (200) configured to protrude the camera module (210) from the TV body (100).

Furthermore, the driving unit (200) may be mounted with the camera module (210).

Hence, the camera module (210) can be protruded from the TV body (100) and driven to photograph an object in front of the TV body (100), because the driving unit (200) is protruded from the TV body (100).

The camera module (210) may be configured to realize a VCS (Video Conference System).

That is, the driving unit (200) is protruded from the TV body (100) to drive the camera module (210).

At this time, the driving of the camera module (210) may include any one of a driving of the camera module (210) while in a power-on state, a driving of the camera module (210) while off a sleep mode, and a driving of the camera module (210) while off a standby mode, whereby the TV apparatus according to an exemplary embodiment of the present disclosure can realize embedment of the camera module (210) inside the TV apparatus, and power consumption of the camera module (210) can be minimized by being driven, in a case the camera module (210) protrudes from a TV body to photograph an object.

Figure 2:
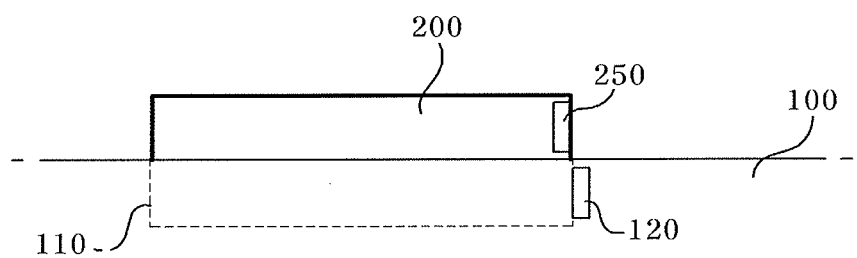
FIG. 2 is a mimetic cross-sectional view illustrating a driving unit of a TV apparatus according to an exemplary embodiment of the present disclosure.
Figure 3A:
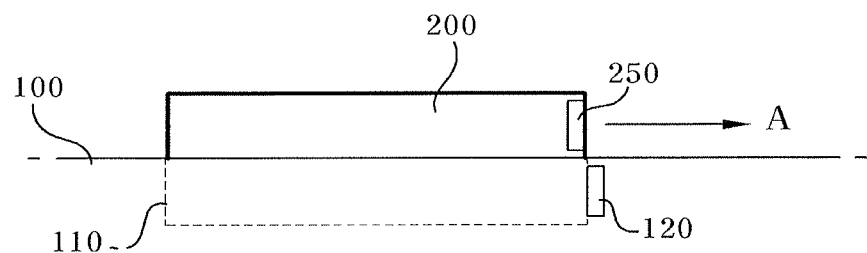
FIGS. 3a and 3b are mimetic cross-sectional views each illustrating an operation of a driving unit of a TV apparatus according to an exemplary embodiment of the present disclosure.
Figure 3B:
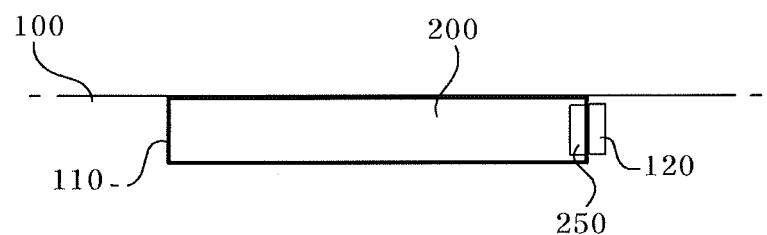
Figure 4:
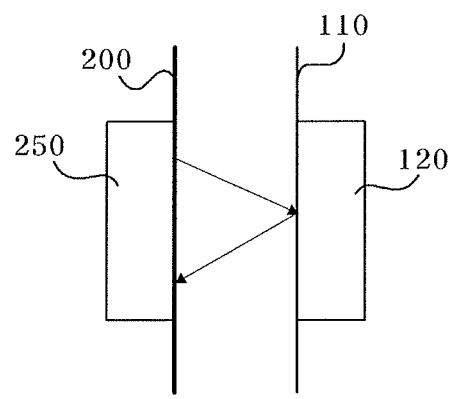
FIG. 4 is a mimetic cross-sectional view illustrating a relationship between a photo reflector of a driving unit on a TV apparatus and a reflector according to an exemplary embodiment of the present disclosure.

FIG. 2 is a mimetic cross-sectional view illustrating a driving unit of a TV apparatus according to an exemplary embodiment of the present disclosure, FIGS. 3a and 3b are mimetic cross-sectional views each illustrating an operation of a driving unit of a TV apparatus according to an exemplary embodiment of the present disclosure, and FIG. 4 is a mimetic cross-sectional view illustrating a relationship between a photo reflector of a driving unit on a TV apparatus and a reflector according to an exemplary embodiment of the present disclosure.

The abovementioned driving unit (200) of the TV apparatus may be mounted with a camera module (210).

Furthermore, the TV body (100) is formed with a receiving unit (110) configured to receive the driving unit (200), as illustrated in FIG. 2. Hence, the driving unit (200) may be in a non-protruded state to the TV body by accommodating the driving unit (200) into the receiving unit (110), or in a protruded state from the TV body by distancing the driving unit (200) from the receiving unit (110). The movement of the driving unit (200) may be enabled by an actuator included inside the TV body (100).

That is, the driving unit (200) is protruded or not protruded from the TV body (100) by the actuator.

Furthermore, the driving unit (200) may be mounted with a photo reflector (250), and the receiving unit (110) may be formed with a reflector (120) configured to reflect light emitted from the photo reflector (250) to the photo reflector (250).

That is, as illustrated in FIG. 3a, the driving unit (200) is deviated from the receiving unit (110), in a case the driving unit (200) is protruded from the TV body (100), whereby the camera module is driven by preventing the light (A) emitted from the photo reflector (250) from being reflected to the photo reflector (250).

Furthermore, as illustrated in FIG. 3b, the driving unit (200) may be accommodated into the receiving unit (110), in a case the driving unit (200) is in a non-protruded state from the TV body, whereby the camera module can be prevented from being driven, can be in a sleep mode or can be in a standby mode by allowing the light emitted from the photo reflector to be reflected from the reflector (120) formed on the receiving unit (110) and to be incident again on the photo reflector (250).

At this time, the reflector (120) may be positioned at a lateral surface or a front surface of the moving camera module.

Figure 5:
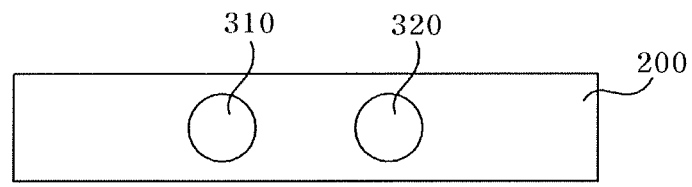
FIG. 5 is a mimetic view illustrating an example of a camera module mounted on a driving unit of a TV apparatus according to an exemplary embodiment of the present disclosure.
Figure 6:
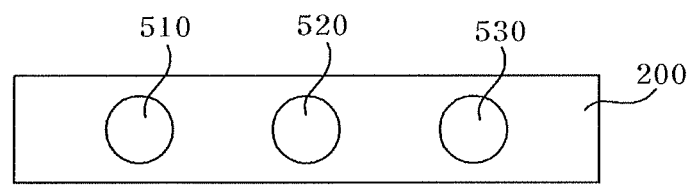
FIG. 6 is a mimetic view illustrating another example of a camera module mounted on a driving unit of a TV apparatus according to an exemplary embodiment of the present disclosure.
Figure 7A:
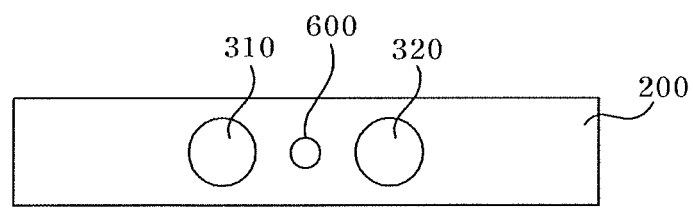
FIGS. 7a and 7b are mimetic views each illustrating a state in which a microphone is mounted on a driving unit of a TV apparatus according to an exemplary embodiment of the present disclosure.
Figure 7B:
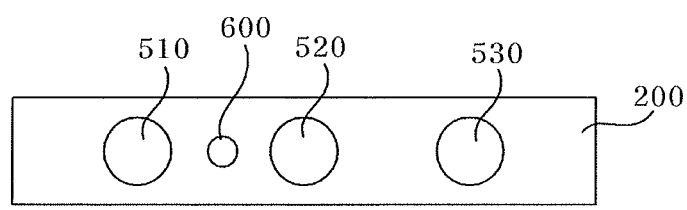

FIG. 5 is a mimetic view illustrating an example of a camera module mounted on a driving unit of a TV apparatus according to an exemplary embodiment of the present disclosure, FIG. 6 is a mimetic view illustrating another example of a camera module mounted on a driving unit of a TV apparatus according to an exemplary embodiment of the present disclosure, and FIGS. 7a and 7b are mimetic views each illustrating a state in which a microphone is mounted on a driving unit of a TV apparatus according to an exemplary embodiment of the present disclosure.

The camera module mounted on the driving unit (200) may include, as illustrated in FIGS, a left eye camera unit (310) configured to photograph a left eye image, and a right eye camera unit (320) configured to be distanced from the left eye camera unit (310) to photograph a right eye image.

That is, the left eye and right eye camera units (310, 320) can obtain a 3D (three dimensional) image.

Referring to FIG. 6, the camera module may include a first camera unit (510) mounted on the driving unit (200), a second camera unit (520) distanced from the first camera unit (510) to photograph a 3D image, and a third camera unit (530) distanced from the second camera unit (520) to extract a 3D depth. At this time, the first camera unit (510) may be a reference camera commonly participating in the photograph of the 3D image and the extraction of the 3D depth.

That is, the first and second camera units (510, 520) may photograph the 3D image, and the first and second camera units (510, 520) may function as a binocular camera.

For example, the first camera unit (510) may photograph a right eye image and the second camera unit (520) may photograph a left eye image. At this time, the first and second camera units (510, 520) minimally maintain an approximate distance of binocular disparity, where it is better to maintain a maximally closest distance. Further-more, a 3D depth is extracted using images photographed by the first and third camera units (510, 530).

At this time, it is better for the first camera unit (510) to be distanced from the third camera unit (530) as long as possible.

That is, if the distance between the first camera unit (510) and the third camera unit (530) is closer, reliability of the extracted 3D depth may be deteriorated to provide a user with dizziness and repulsion in a case the 3D depth is utilized as an input of a game.

Thus, the third camera unit (530) according to the exemplary embodiment of the present disclosure may be used as an input device by extracting a 3D depth using the images photographed by the first and third camera units (510, 530).

Therefore, a camera module structure arranged with the first, second and third camera units (510, 520, 530) can be advantageously realized in the exemplary embodiment of the present disclosure to generate a 3D image and to extract a 3D depth at the same time.

In addition, each of the first, second and third camera units (510, 520, 530) in the camera module structure according to the exemplary embodiment of the present disclosure may include an image sensor, and each of the image sensors on the first, second and third camera units (510, 520, 530) may be mounted on one substrate.

Furthermore, each of the first, second and third camera units (510, 520, 530) may be applied in plural according to a relevant function, and in a case the number of each of the first, second and third camera units (510, 520, 530) is plural, much more information on a target can be obtained.

Furthermore, one of the first, second and third camera units (510, 520, 530) may be arranged in plural, whereby a much clearer 3D image, a much more accurate depth information and an input device can be obtained.

At the same time, in a case an IR (Infrared) pixel or sensor is applied, depth information even at a low light level can be accurately obtained.

In addition, in case of data output, a separate parallel or serial output for each sensor may be enabled, and in case of one output, the data output may be outputted in a high speed serial signal Meanwhile, the camera module may further include a microphone (600) interposed between the camera units. For example, the microphone (600 may be interposed between the left and right eye camera units (310, 320) as illustrated in FIG. 7a, or the microphone (600) may be interposed between the first and second camera units (510, 520) or between the second and third camera units (520, 530), as illustrated in FIG. 7b, where the first, second and third camera units (510, 520, 530) may be arranged in a row.

Figure 8:
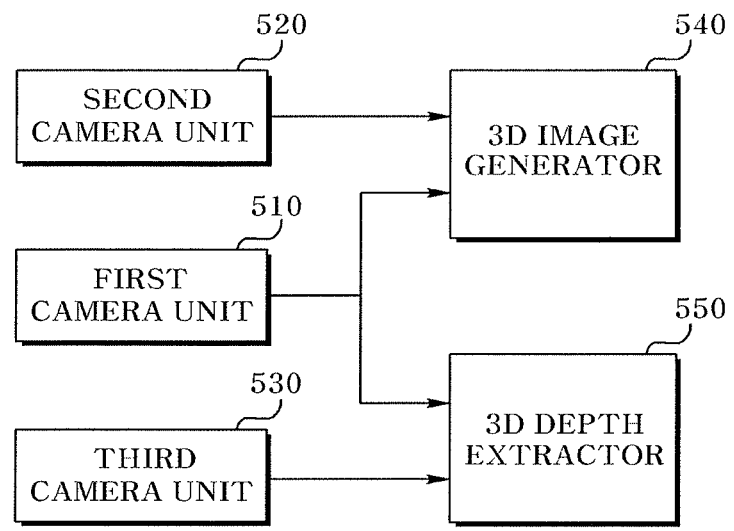
FIG. 8 is a block diagram illustrating a part of a TV apparatus according to an exemplary embodiment of the present disclosure.

FIG. 8 is a block diagram illustrating a part of a TV apparatus according to an exemplary embodiment of the present disclosure.

The TV apparatus according to an exemplary embodiment of the present disclosure includes a first camera unit (510), a second camera unit (520) distanced from the first camera unit (510) to photograph a 3D image, a third camera unit (530) distanced from the second camera unit (520) to extract a 3D depth, a 3D image generator (540) configured to generate a 3D image using the images photographed by the first and second camera units (510, 520), and a 3D depth extractor (550) configured to extract a 3D depth using the images photographed by the first, second and third camera units (510, 520, 530).

Hence, the 3D depth extractor (550) in the TV apparatus according to an exemplary embodiment of the present disclosure generates a 3D image using the images photographed by the first and second camera units (510, 520), and the 3D depth extractor (550) extracts a 3D depth using the images photographed by the first and third camera units (510, 530).

Figure 9:
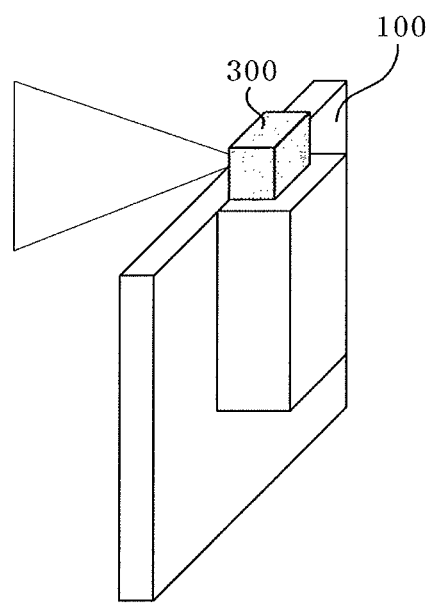
FIG. 9 is a mimetic perspective view illustrating a TV apparatus according to another exemplary embodiment of the present disclosure.
Figure 10:
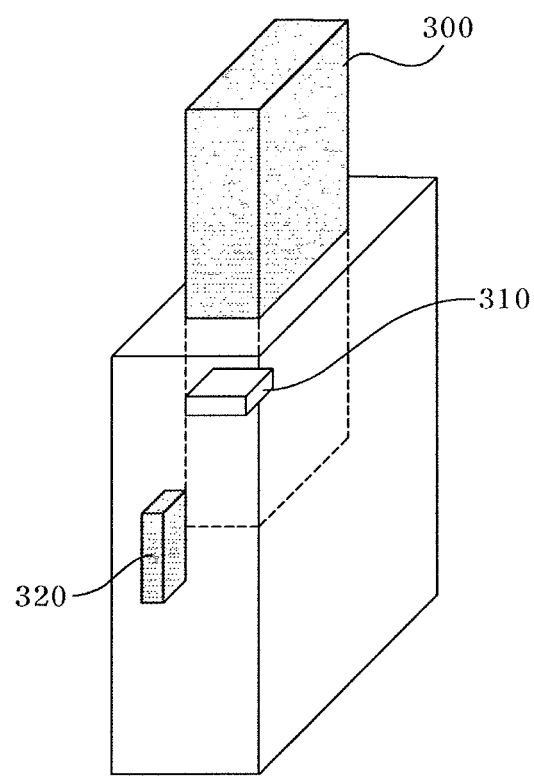
FIG. 10 is a mimetic perspective view illustrating an example of a magnetic field converting means of FIG. 9.

FIG. 9 is a mimetic perspective view illustrating a TV apparatus according to another exemplary embodiment of the present disclosure, and FIG. 10 is a mimetic perspective view illustrating an example of a magnetic field converting means of FIG. 9.

Referring to FIG. 9, the TV apparatus according to another exemplary embodiment of the present disclosure the TV apparatus comprises: a TV body (100) configured to display an image; and a camera module (300) mounted on the TV body (100) and configured to be turned on and turned off by a magnetic field configured to change in response to movement of the camera module.

That is, the magnetic field changes, in a case the camera module (300) is moved, and the camera module (300) is turned on or turned off in response to the changed magnetic field, where the movement of the camera module is sliding or tilting.

Furthermore, the TV apparatus may further comprise a magnetic sensor configured to detect a magnetic field that changes in response to the movement of the camera module (300).

Still furthermore, as illustrated in FIG. 10, the TV apparatus according to another exemplary embodiment of the present disclosure may further comprise a magnet (320) fixed to the TV body (100), and a magnetic sensor (310) configured to change positions in response to the movement of the camera module (300), and configured to detect or not to detect a magnetic field of the magnet (320).

That is, the magnetic sensor (310) may be so configured as to move to a direction of the moving camera module (300).

For example, the magnetic sensor (310) may be mounted on a moving body configured to move the camera module (300).

Conversely, the TV apparatus may include a magnet that changes positions in response to the movement of the camera module (300), and a magnetic sensor (310) configured to change positions in response to the movement of the magnet (320), and configured to detect or not to detect a magnetic field of the magnet (320).

In conclusion, the TV apparatus according to another exemplary embodiment of the present disclosure can operate the camera module (300) by the movement of the camera module (300) being present within a magnetic field detection scope, or by the movement of the camera module (300) being deviated from a magnetic field detection scope.

Figure 11:
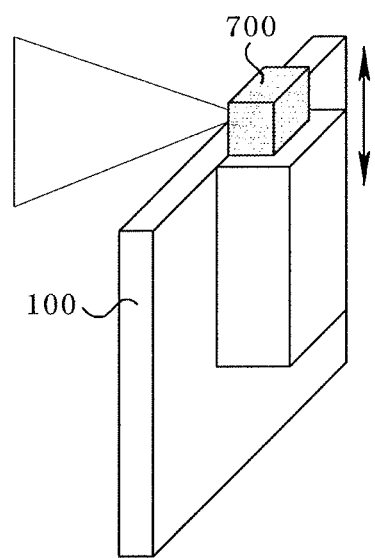
FIG. 11 is a mimetic perspective view illustrating a TV apparatus according to still another exemplary embodiment of the present disclosure.

FIG. 11 is a mimetic perspective view illustrating a TV apparatus according to still another exemplary embodiment of the present disclosure.

The TV apparatus according to still another exemplary embodiment of the present disclosure comprises: a TV body (100) configured to display an image, a camera module (700) configured to protrude or not to protrude from the TV body, and a photo diode mounted on the camera module (700) and configured to output a signal for controlling operation of the camera module (700) by receiving or not receiving light, in a case the camera module protrudes or fails to protrude from the TV body.

At this time, the photo diode may output a control signal, a sleep mode signal, or a standby mode signal configured to turn on an electric power of the camera module (700) by receiving light, in a case the camera module (700) protrudes from the TV body (100), and configured to turn off an electric power of the camera module (700) by not receiving the light, in a case the camera module fails to protrude from the TV body.

For example, the camera module (700) may be mounted on a sliding structure to be protruded or not to be protruded from the TV apparatus (100), whereby the photo diode may be also protruded or not to be protruded from the TV apparatus (100).

At this time, the TV apparatus may further comprise a controller configured to control the operation of the camera module (700) by receiving the control signal of the photo diode.

Although exemplary embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

What is claimed is:

1. A display apparatus, comprising:
a main body;
a display part disposed on a front surface of the main body;
a receiving unit downwardly recessed from an upper surface of the main body;
a camera module selectively accommodated in the receiving unit, and photographing an object;
a driving unit formed with the camera module;
an actuator moving the camera module; and
a sensor sensing the camera module,
wherein the camera module has a shape of a rectangular parallelepiped and the receiving unit has a shape corresponding to the camera module,
wherein an upper surface of the camera module is formed as one plane surface with the upper surface of the main body when the camera module is accommodated in the receiving unit,
wherein the receiving unit is spaced from an edge of the upper surface of the main body,
wherein the sensor comprises a photo reflector disposed on the driving unit and a reflector disposed on the receiving unit and configured to reflect light emitted from the photo reflector to the photo reflector,
wherein the camera module comprises a first camera unit and a second camera unit spaced from each other,
wherein the first camera unit is configured to photograph a left eye image, and the second camera unit is configured to be distanced from the first-camera unit to photograph a right eye image,
wherein the first camera unit and the second camera unit face toward a front side, and
wherein, in a case the camera module is accommodated in the receiving unit, the camera module is driven in a sleep mode or a standby mode, when power is supplied to the camera module and the sensor senses the camera module accommodated in the receiving unit.

2. The display apparatus of claim 1, wherein the driving unit formed with the camera module is selectively accommodated in the receiving unit, and
wherein the actuator moves the driving unit and the camera module.

3. The display apparatus of claim 2, wherein the sensor further comprises a magnet disposed in the main body, and a magnetic sensor disposed on the driving unit and configured to detect a magnetic field of the magnet.

4. The display apparatus of claim 1, wherein the camera module is configured to realize a VCS (Video Conference System).

5. The display apparatus of claim 1, wherein the camera module further comprises a third camera unit, and
wherein the second camera unit is distanced from the first camera unit to photograph a 3D (three dimensional) image, and the third camera unit is distanced from the second camera unit to extract a 3D depth.

6. The display apparatus of claim 5, wherein the camera module further includes a microphone interposed between the first and second camera units or a microphone interposed between the second and third camera units.

7. The display apparatus of claim 5, wherein the TV body includes a 3D image generator configured to generate a 3D image using an image photographed by the first and second camera units, and a 3D depth extractor configured to extract a 3D depth using an image photographed by the first and third camera units.

8. The display apparatus of claim 1, wherein a movement of the camera module is sliding or tilting.

9. The display apparatus of claim 1, wherein the sensor comprises a photo diode disposed on the camera module.

10. The display apparatus of claim 1, wherein the camera module is driven in a power-on state, when the camera module is not sensed by the sensor.

11. The display apparatus of claim 1, wherein the camera module is driven in a power-off state, when the camera module is sensed by the sensor.

* * * * *